United States Patent Office 3,336,989
Patented Aug. 22, 1967

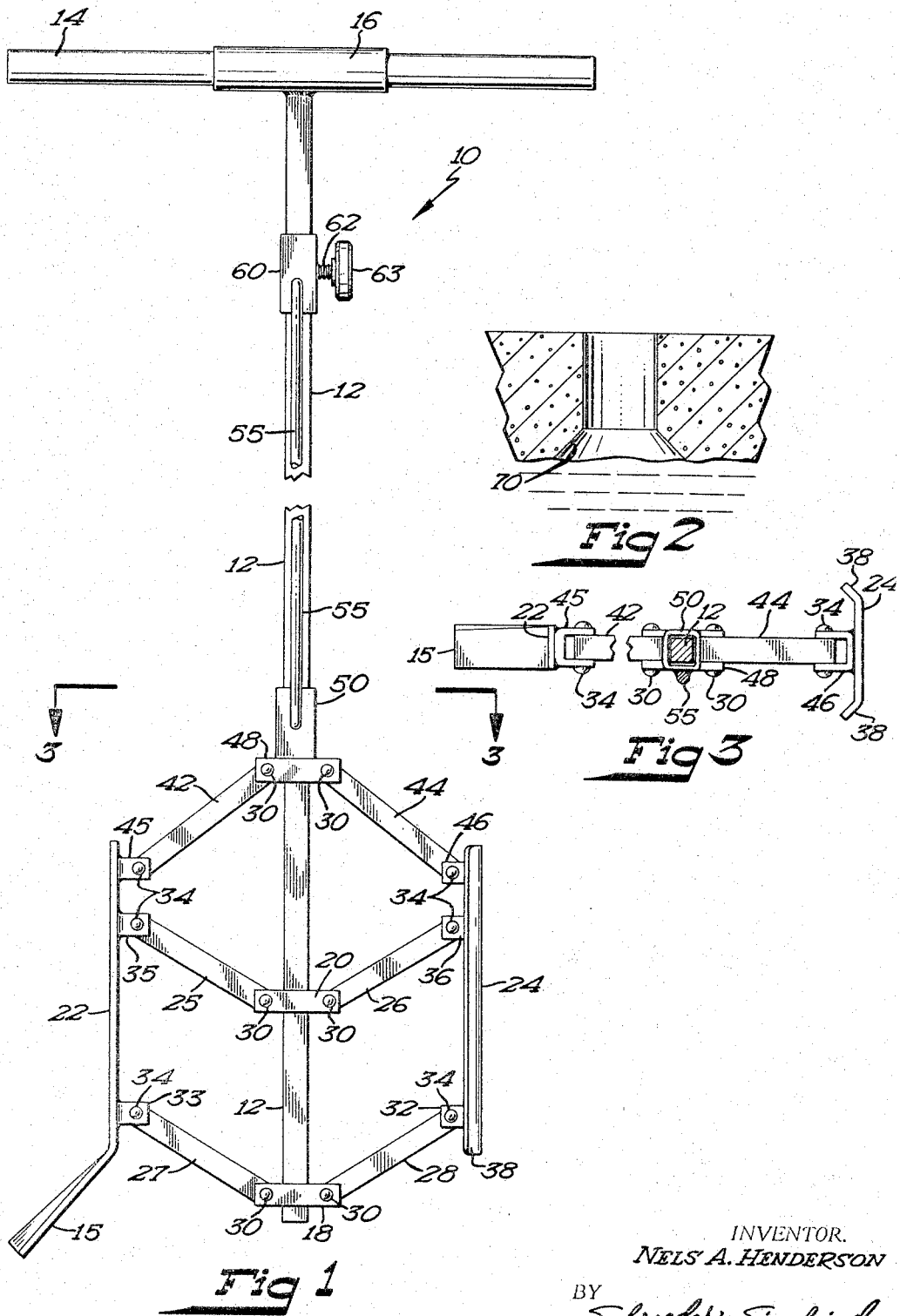

3,336,989
ICE HOLE FLARING TOOL
Nels Alfred Henderson, 4901 76th Ave. N.,
Minneapolis, Minn. 55429
Filed Feb. 4, 1965, Ser. No. 430,280
7 Claims. (Cl. 175—18)

ABSTRACT OF THE DISCLOSURE

This disclosure relates to an ice hole flaring tool which has a shaft member and a pair of spaced fixed brackets positioned near one extremity of the shaft member. A pair of elongated side members are mounted on the brackets through linkages in such a manner that the side members move parallel to the shaft. A second shaft slidably mounted on the first shaft and connected to the side members moves the side members simultaneously toward and away from the shaft. One of the side members includes a cutting means formed integral therewith and at the extremity of the same which cutter means extends at an angle to the side members and away from the shaft. The first named shaft includes a handle for rotating the shaft within an ice hole so that the cutter positioned at an angle to the shaft will flare the extremity of an ice hole remote from the handle.

This invention relates to ice hole cutting tools and more particularly to an ice hole flaring tool for flaring the bottom side of an ice hole used in ice fishing.

Various types of powered and manually driven ice cutting augers have been employed for the cutting of holes in ice for the use in fishing. These have been provided with adjustable means whereby the auger will cut and clean the hole in varying sizes but all such augers leave a straight wall or cylindrical opening in the ice for fishing purposes. Such a type of an ice fishing hole presents a disadvantage in that fish, both large and small, are apt to be dislodged from the hook as they engage the sharp edge of the lower surface of the ice hole when they are withdrawn from the water through the ice hole. The improved ice cutting tool provides a simplified means of tapering or flaring the bottom surface of the hole to facilitate movement of the fish as it is brought to the surface of the water and prevent the hook from being dislodged.

Therefore it is an object of this invention to provide an improved ice hole flaring tool for ice fishing.

Another object of this invention is to provide an ice hole flaring tool for tapering the bottom of an ice fishing hole to prevent fish from catching or jarring on the edges of the hole as they are withdrawn from the water such as to dislodge the hook therefrom.

A still further object of this invention is to provide an ice hole flaring tool with means for adjustment to accommodate various sized ice fishing holes and means for centering the ice hole fishing tool in the flaring operation.

These and other objects of this invention will become apparent from a reading of the attached description together with the drawings wherein:

FIGURE 1 is an elevation view of the ice hole flaring tool,

FIGURE 2 is a sectional view of the ice hole with the hole flared by using the improved flaring tool, and FIGURE 3 is a sectional view of the ice hole flaring tool of FIGURE 1 taken along the lines 3—3 therein.

The improved ice hole flaring tool is shown generally in elevation in FIGURE 1 at 10, the tool comprising a shaft 12 having a handle 14 mounted at one extremity thereof and a cutting blade 15 at the opposite extremity. Handle 14 is positioned through a transversely extending tubular flange 16 connected to the shaft 12 and is suitably secured therein to provide for manual rotation of the shaft in the flaring operation. The opposite extremity of the shaft mounts a pair of transversely extending brackets 18 and 20 which are secured to the shaft through suitable means not shown. Brackets 18 and 20 mount respectively a pair of side members or support members 22, 24 through pivoted linkages 25, 26, 27 and 28. Thus as will be seen in FIGURE 1, bracket 18 pivotally mounts the linkages 27, 28 at one extremity of the linkages through pivotal connections indicated at 30 and the opposite extremities of the linkages 27, 28 connect to flanges 32, 33 respectively to provide pivot connections 34 at these extremities of the linkages. Similarly the flange 20 pivotally mounts the linkages 25, 26 through pivot connections 30 with the opposite extremities of the linkages 25, 26 being connected at flanges 35, 36 on the side or support members 22, 24 respectively through pivotal connections 34.

As will be seen in FIGURES 1 and 3, the side member 22 is a flat elongated plate terminating in the cutter or flaring tool 15 which may be formed integral therewith or may be suitably connected thereto. Similarly, the side member or support member 24 is elongated in construction and of wider width than the member 22 having bent extremities 38 to provide for a guiding function of the flaring tool, as will be hereinafter defined. Thus it will be seen that the linkages 25, 27 and 26, 28, since they are of the same length, provide for a parallelogram type mounting of the side members or support members 22, 24 on the shaft 12 such that the members 22, 24 may be moved in an arcuate manner parallel to the extent of the shaft 12. The support member 22 mounting the cutter 15 and support member 24 will be equidistantly spaced from the shaft 12 throughout this adjusting movement. Such movement is accomplished by a driving connection or adjusting connection, to be later defined. Thus the shaft 12 will be equidistantly spaced from the side surface of an ice hole as the tool is rotated manually in the flaring operation and the support member 24 with the tapered or bent extremities 38 serves as a guide as the shaft 12 is rotated within the hole.

The support members 22, 24 are moved simultaneously through additional linkage connections comprising linkage members 42, 44 which are connected at one extremity to flanges 45, 46 respectively, mounted on support members 22, 24 through pivotal connections 34 and at the opposite extremity to a bracket member 48 mounted on a sleeve 50 and shaped similar to the brackets 18 and 20. A pivotal connection 30 mounts the linkages 42, 44 on the bracket 48. Sleeve 50 is slidably mounted on the shaft 12 and movement of the sleeve along the length of the shaft will cause the linkages to move the side members 22, 24 toward and away from the shaft 12 simultaneously and to the same extent.

Sleeve 50 has connected thereto a rod 55 which is mounted at its opposite extremity on a sleeve 60 located near the handle extremity of the shaft 12. Sleeve 60 includes a tapped stop member 62 having a handle 63 thereon and threaded through a tapped aperture (not shown) in the sleeve 60 so that the stop member 62 may be threaded against the shaft 12 to secure the sleeve 60 thereon. With this construction, the sleeve 60 may be moved up and down the shaft 12 and such movement will be transmitted through the rod 55 to move the sleeve 50 at the lower extremity of the shaft to expand and contract or adjust the radial distance of the cutting tool such that it may be fitted in any sized ice hole within the physical dimension of the flaring tool. The sleeve 60 will normally be raised to collapse the tool as it is inserted into an ice hole so that the outwardly extending cutting blade 15 may be positioned therethrough. After the shaft has been inserted to the depth of the hole, the sleeves 60 and 50 will be adjusted or positioned on the shaft to expand the side members 22, 24 or move them radially away from the shaft such that they engage the side surface of the ice hole near the bottom thereof. The support member 20 serves as a guide and the member 22 mounts the cutting blade such that it will engage the edge of the hole for flaring or cutting an angle cut at the bottom of the hole, such as is shown at 70 in FIGURE 2. When the tool has been adjusted to the diametrical size of the ice hole and the support members 22, 24 engage the surface thereof, the stop member 62 will be threaded into the sleeve 60 through rotation of the handle 63 to secure the tool in this position. Thereafter rotation of the shaft 12 through rotational movement imparted to the handle 14, either manually or through power means (not shown), as the shaft is raised with respect to the ice hole will cut the ice in a flared fashion as shown in FIGURE 2 to taper the lower extremity of the hole and facilitate removal of fish through the ice.

The sectional view in FIGURE 3 shows the cutting tool or flaring tool in an expanded position with the bent sides 38 of the support member 24 which guide the tool to facilitate rotation in the ice hole. As the tool is rotated, it will be also raised by lifting upwardly on the handle 14 to provide the flared cutting action of the ice at the bottom edge of the hole.

With this type of flared cut in the bottom of an ice hole for fishing, the angler may then withdraw his fishing tackle after a fish has been hooked without the danger of the fish engaging the bottom edge of the hole as it is being raised such as to jar the hook from its mouth. It will be seen that the improved flaring tool is simple in construction and may be readily inserted into a fishing ice hole in the collapsed position to permit entry of the same therethrough. It may be readily extended or expanded to fit the size of the hole and clamped or locked in this position such that the tool may be manually rotated and the cutting blades 15 engage the lower edge of the hole to flare a cut on the bottom edge of the hole to facilitate fishing. After the flare cut has been made, the tool may again be collapsed and in the collapsed position withdrawn from the hole readily. The improved construction is simple in design and low in cost such as to be readily available for most ice fishing anglers.

While the improved flaring tool is normally made of metallic material, it will be recognized that changes may be made in the size and shape of the parts as well as the materials therein without departing from the scope of the present invention. Therefore I wish to be limited only by the appended claims.

What is claimed is:

1. An ice hole flaring tool comprising, a shaft, a pair of spaced fixed bracket means positioned near one extremity of the shaft, a pair of elongated side members adapted to engage the side surface of the ice hole, linkage means pivotally connected to the pair of brackets and the elongated side members to move the side members parallel to the shaft, means slidably mounted on the shaft and connected to the side members to move the side members simultaneously toward and away from the shaft, cutter means integral with the extremity of at least one of said members and extending at an angle to the side members and away from the shaft, and handle means connected to the other extremity of the shaft for rotating the shaft within an ice hole to flare the extremity of the hole remote from the handle extremity of the tool.

2. The ice hole flaring tool of claim 1 in which the means slidably mounted on the shaft for moving the side members relative to the shaft includes means extending to the other end of the shaft adjacent the handle means to effect positioning of the side members relative to the shaft.

3. The ice hole flaring tool of claim 2, and including means positioned on the slidably mounted means for securing the same to the shaft in varying positions to secure the positioning of the side members relative to the shaft.

4. The ice hole flaring tool of claim 3, in which the means slidably mounted on the shaft includes a pair of sleeves positioned near opposite extremities of the shaft and interconnected by a tie rod with one of said sleeves being connected to the side members through pivoted linkages to effect positioning of the side members relative to the shaft with movement of the other of said sleeves and said tie rod.

5. The ice hole flaring tool of claim 4 in which the linkage means includes a pair of linkages connected to each of the spaced fixed brackets and pivotally mounted at the opposite extremities on the respective elongated side members such as to move the side members in parallel relationship simultaneously relative to the shaft means.

6. The ice hole flaring tool of claim 5 and including a guide plate connected to one of said side members to guide one of said side members in the ice hole for manual rotation of the shaft means and the cutter means in the flaring operation.

7. An ice hole flaring tool comprising, a shaft means, a pair of spaced fixed brackets connected near one extremity of the shaft means, cutter means, a pair of elongated support members at least one of which is connected to the cutter means to mount said cutter means relative to the shaft means, linkage means pivotally mounted on the spaced fixed brackets and connected to support members of the cutter means, said cutter means being directed in a direction away from said shaft means and adapted to engage the edge of an ice hole to flare the same with rotation of the shaft means, and means slidably mounted on the shaft means and connected to the pivotally mounted support members to vary the position of the cutter means relative to the shaft means, said cutter means being formed integral with one of said support members.

References Cited

UNITED STATES PATENTS

| | | | |
|---|---|---|---|
| 475,913 | 5/1892 | Yorke | 175—285 X |
| 1,970,063 | 8/1934 | Steinman | 175—285 X |
| 2,450,223 | 9/1948 | Barbour | 175—285 X |

DAVID H. BROWN, *Examiner.*

CHARLES E. O'CONNELL, *Primary Examiner.*